United States Patent [19]
Cochran

[11] 4,406,784
[45] Sep. 27, 1983

[54] BYPASS OIL FILTER ADAPTER

[75] Inventor: Clarence L. Cochran, Stockton, Calif.

[73] Assignee: Frantz Filters, Inc., Stockton, Calif.

[21] Appl. No.: 367,321

[22] Filed: Apr. 12, 1982

[51] Int. Cl.³ .................... F01M 1/10; B01D 27/10
[52] U.S. Cl. .................. 210/168; 210/416.5; 210/444; 123/196 A
[58] Field of Search .............. 210/416.5, 444, 132, 210/133, 232, 238, 168, 254; 285/132; 123/196 A, 196 R; 55/309, 484

[56] References Cited

U.S. PATENT DOCUMENTS

| | | | |
|---|---|---|---|
| 2,253,685 | 8/1941 | Burckhalter | 210/133 |
| 2,897,966 | 8/1959 | Humbert, Jr. | 210/133 |
| 3,039,485 | 6/1962 | Brohl | 210/444 |
| 3,540,594 | 11/1970 | Sanderson | 210/232 |
| 3,743,096 | 7/1973 | Harvey, Jr. et al. | 210/232 |
| 3,982,520 | 9/1976 | Wheeler | 210/444 |
| 4,032,447 | 6/1977 | Douglass | 210/168 |
| 4,051,036 | 9/1977 | Conrad et al. | 210/232 |
| 4,265,748 | 5/1981 | Villani et al. | 210/132 |

FOREIGN PATENT DOCUMENTS 520779  10/1939  United Kingdom ........... 210/132

Primary Examiner—Charles N. Hart
Assistant Examiner—John W. Czaja
Attorney, Agent, or Firm—Townsend & Townsend

[57] ABSTRACT

An adapter 10 for connecting a bypass oil filter to an internal combustion engine 14 having a full flow lubricating system is mounted between the oil filter mounting block 12 and the conventional full flow filter 16. The adapter includes means 48, 52 for diverting a portion of the circulating oil flow to the bypass filter and means 46, 74, 76 for returning that portion to the engine. The adapter includes a body portion 36 and an insert 60 which together define the passages necessary for diverting a portion of the oil flow to the bypass filter. The body includes a central axial 38 opening which receives the insert, the body and insert together defining an annular chamber 76 which receives clean oil from the bypass filter through a radial passage 46 in the body. An axial passage 68 in the insert allows clean oil to flow from the full flow filter to the engine and a plurality of radial passages 74 allow clean oil from the bypass filter to enter the axial passage 68 regardless of the relative orientations of the insert and the body. Additional passages are formed in the body to provide the remaining flow paths necessary for the bypass flow.

4 Claims, 3 Drawing Figures

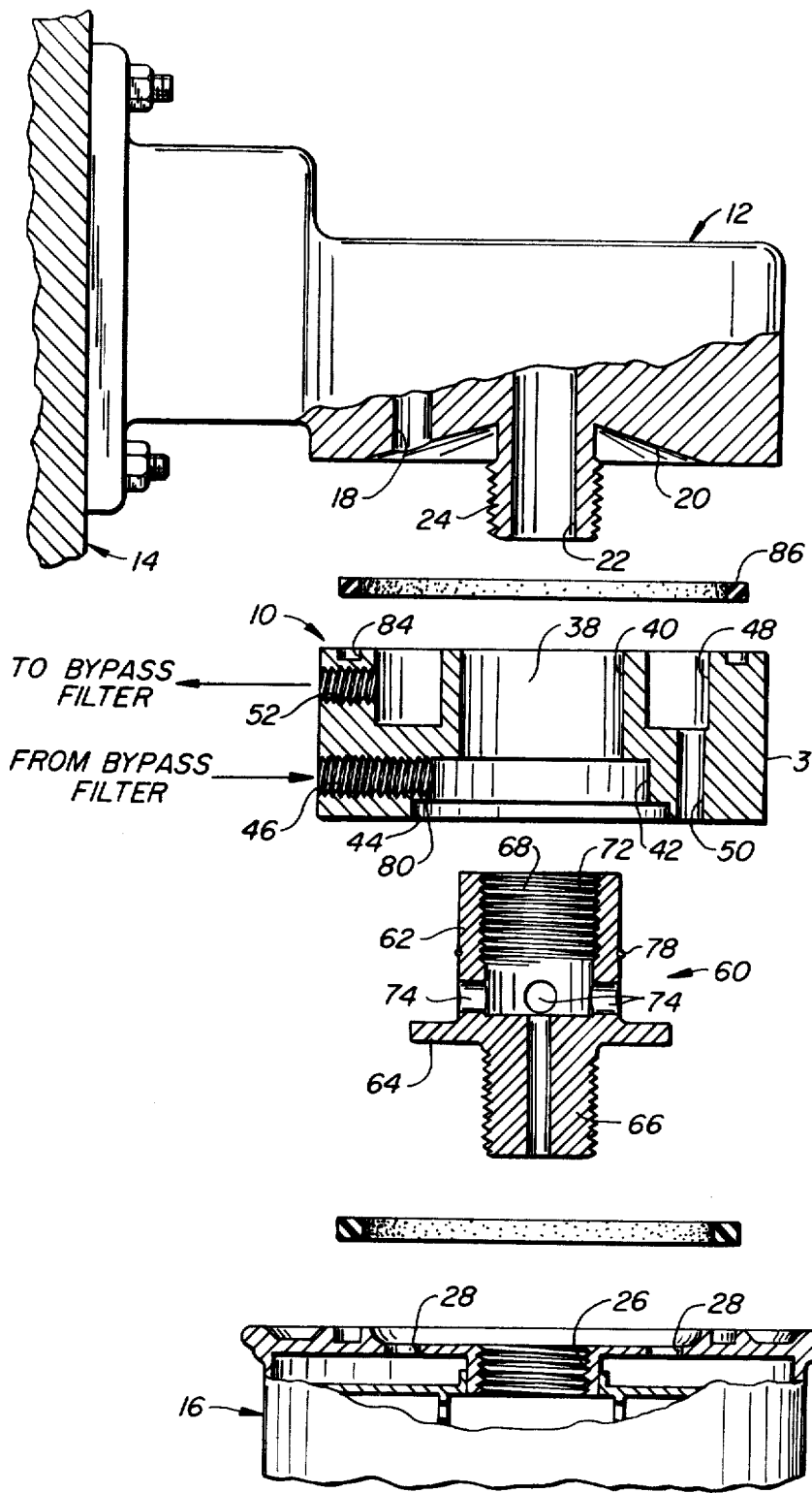
FIG._1.

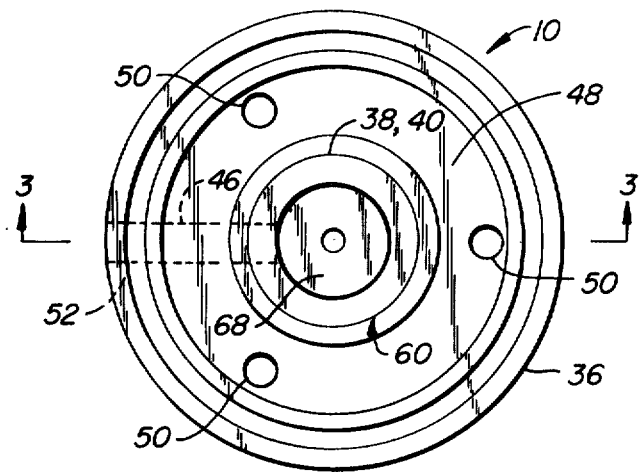
FIG._2.
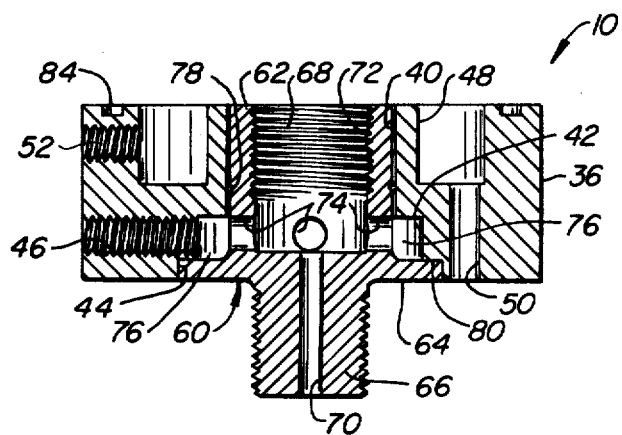
FIG._3.

4,406,784

BYPASS OIL FILTER ADAPTER

BACKGROUND OF THE INVENTION

1. Field of the Invention

The present invention relates generally to a bypass oil filtering system for an internal combustion engine, and more particularly to an adapter for connecting a bypass oil filter to an engine lubrication system while leaving the full flow filter in place.

In general, internal combustion lubrication systems operate on either a full flow or bypass principle. In full flow operation, the entire circulating oil stream is passed through the engine oil filter (referred to as a full flow oil filter) before it returns to the engine. In a bypass system, only a portion of the circulating oil stream is passed through the engine oil filter (referred to as a bypass oil filter) prior to being returned to the engine.

The full flow filter and the bypass filter each offer benefits not found in the other. The bypass oil filter will typically be more efficient and achieve a higher degree of contaminant removal than the full flow filter, but filters the oil less frequently. Conversely, the full flow filter filters the oil more often, but must use a relatively coarse filtering media in order to pass the entire volume of circulating oil required to lubricate the engine. Such a coarse media does not remove small contaminant particles, causing sludge deposits and contributing to engine wear. Moreover, as dirt accumulates in a full flow filter, the flow of oil is restricted. To prevent cessation of oil flow, the full flow filter system must be provided with a bypass valve that opens when the pressure drop across the full flow filter becomes excessive. The bypass valve allows oil to continue circulating, but such oil is not filtered at all.

While most automobile engines are equipped only with a full flow filtering system, many people desire to add on a bypass filter to enjoy the advantages associated with each system. Heretofore, bypass filters have been connected to full flow lubrication systems by means of an adapter placed between the full flow filter mounting block and the full flow filter itself. The oil is returned to the engine block typically by tapping the oil pan or by using a hollow bolt. The need to punch a hole in the oil pan or otherwise tamper with the engine block is undesirable and it would therefore be useful to provide an adapter having means both for supplying dirty oil to the bypass filter and returning the filtered oil to the engine.

2. Description of the Prior Art

A bypass oil filter is described in U.S. Pat. No. 3,308,956 to Yee, et al., an oil filter adapter for connecting a bypass filter to an internal combustion engine is disclosed in U.S. Pat. No. 3,540,594 to Sanderson.

SUMMARY OF THE INVENTION

The present invention provides an adapter which may be mounted on a conventional filter mounting block on an internal combustion engine having a full flow lubrication system. The adapter includes means for passing the major portion of the circulating oil flow to the full flow filter which is mounted directly thereon. The adapter also includes means for providing a bypass oil flow, which comprises from about 5 to 25% of the total circulating oil flow, to a bypass filter and for returning the bypass stream after it has been filtered to the engine. In this way, the ability of a bypass filter to reduce sludge and other small particulates in the circulating oil stream may be enjoyed on an engine having a full flow lubrication system. Moreover, this benefit is achieved without modifying the engine in any way and requires only that the adapter be placed between the filter mounting block and the full flow filter.

The adapter comprises a body having various passages from therein and an insert which couples directly to both the engine mounting block and the full flow filter to secure the assembly of the mounting block, the filter and the adapter tightly together. The body includes a central opening defining three sections of increasing cross-sectional area. The face of the adapter which includes the smallest section of the passage also includes an annular channel formed therein for receiving dirty oil from the mounting block. An axial passage connects the annular channel with the full flow filter to pass the majority of the oil to said filter. A first radial passage defines the dirty oil outlet for the bypass filter. A second radial passage defines the clean oil inlet from the bypass filter and is in fluid communication with the second section of the central opening.

The insert includes means for securing both the filter mounting block and the full flow filter and acts as a bridge in connecting the two. The insert may be inserted into the central passage of the body and holds the body in proper alignment with the mounting block and the full flow filter when so connected. Additionally, the insert and the second section of the central opening of the body together define an annular chamber which receives the clean oil flowing in through the second radial passage. The insert further includes an axial passage for flowing clean oil from the full flow filter to the mounting block and at least one radial passage allowing clean oil from the annular chamber to flow into the axial passage and eventually return to the engine.

The bypass oil filter adapter of the present invention provides a particularly compact device for connecting a bypass filter to an engine having a conventional full flow lubrication system. Moreover, by providing an insert for connecting the filter to the mounting block and a body which may be freely rotated relative to the insert, the connections to the adapter for the bypass filter may be oriented as desired for convenient connection to the bypass filter.

DESCRIPTION OF THE DRAWINGS

FIG. 1 is an exploded view showing the filter adapter of the present invention in relation to a conventional filter mounting block and a full flow oil filter.

FIG. 2 is a top view of the adapter of the present invention.

FIG. 3 is a sectional view taken along line 3—3 of FIG. 2.

DESCRIPTION OF THE PREFERRED EMBODIMENT

Referring to FIGS. 1, 2 and 3, an adapter 10 may be mounted on an oil filter mounting block 12 of an internal combustion engine 14 (partly illustrated in FIG. 1) having a full flow lubrication system. With such a lubrication system, the entire recirculating oil flow of the engine is directed to a conventional oil filter 16 (partly illustrated in FIG. 1), typically by a passage such as outlet 18, which terminates in a conical depression 20 formed in one end of the mounting block 12. The oil flow is returned to the engine through inlet 22 defined by a threaded stud 24 projecting downward (as viewed in FIG. 1) from the apex of the conical depression 20. In the absence of the adapter 10 the full flow filter 16 will mount directly on the stud 24 by means of a threaded port 26, which defines the clean oil outlet of the filter. Dirty oil enters the filter 16 through a plurality of inlet ports 28 which communicate with a plenum defined by the conical depression 20 and the upper surface of the filter 16 when the filter is mounted on the mounting block 12. As the oil passes from the inlet 28 to the outlet 26, it is filtered through the filtering media in a conventional manner which does not form a part of this invention and need not be described.

Although the oil filter mounting block 12 and oil filter 16 just described are typical of those found on internal combustion engines, such as automobile engines, the exact configurations may vary. The adapter 10 of the present invention, however, can be modified slightly to conform to the particular configuration encountered.

The adapter 10 includes a body 36, typically an aluminum casting having a plurality of passages and voids formed therein, as will now be described. A central opening 38 defines three sections 40, 42 and 44 of successively larger cross-sectional area. A first radial conduit 46 extends between the middle section 42 of the central opening 38 and the outer cylindrical wall of the body 36. The conduit 46 defines the oil return from the bypass filter, as will be described in more detail hereinafter.

An annular channel 48 is formed in the upper face (as viewed in FIG. 1) of the body 36 and surrounds the small section 40 of the central opening 38. The channel 48 is positioned so that it receives oil from the outlet 18 when the adapter 10 is mounted on the block 12. A plurality of axial conduits 50 define a passage from the annular channel 48 to the inlet ports 28 of the filter 16. A second radial conduit 52 defines a dirty oil outlet for connection to the bypass filter. Both the inlet 46 and the outlet 52 are threaded for convenient connection to flexible connecting lines (not shown) which may be routed as necessary to the remotely mounted bypass filter (not shown).

An insert 60 includes an internally threaded cylinder 62, a flange 64 and an externally threaded nipple 66. An axial passage 68 includes a narrow portion 70 passing through the nipple 66 and a larger portion 72 which defines the threaded cylinder 62. A plurality of ports 74 are formed through the cylindrical wall 62 at a position sufficiently close to the flange 64 so that the passages are not blocked when the insert 60 is mounted on the mounting block stud 24.

Referring now in particular to FIG. 3, when the insert 60 is inserted into the body 36, an annular chamber 76 is defined by the second section 42 of the axial opening 38 and the outer cylindrical wall 62 of the insert. Further, by matching the diameter of the cylinder 62 with the internal diameter of the first section 40 of the opening 38, the upper end of the annular chamber is sealed. Typically, an O-ring 78 is provided to assure a tight seal. Additionally, the flange 64 on the insert 60 mates with a radial face 80 defined by the transition between the second section 42 and the third section 44 of the opening 38. This mating seals the lower end of the annular chamber 76.

Oil flows into the annular chamber 76 from the bypass filter by means of the first radial conduit 46. The chamber then forms a header which evenly distributes the oil among the several radial passages 74 in the insert 60. The chamber 76 allows the body 36 to be rotated relative to the insert 60 without affecting the passage of oil into the axial passage 68 of the insert 60. This feature is important since it allows the assembly of the full flow filter 16, the adapter 10 and the mounting block 12 to be fully tightened regardless of the rotational orientation of the adapter body 36 relative to the mounting block 12 and/or the filter 16. Thus, the connections 46 and 52 may be rotated relative to the block 12 as convenient to allow access to said connections.

An annular groove 84 formed in the upper face of the body 36 receives a sealing ring 86 which prevents oil leakage between the adapter 10 and the filter mounting block 12.

Although the best mode contemplated for carrying out the present invention has been herein shown and described, it will be appreciated that variations and modifications may be made without departing from what is regarded to be the subject matter of the present invention.

What is claimed is:

1. In combination with an engine lubricating system including a full flow filter 16 and a filter mounting block 12 having means 18, 20 for flowing dirty oil to said full flow filter and means 22, 24 for receiving clean oil from said filter, an adapter 10 for bypassing a portion of the dirty oil to a bypass filter and for returning cleaned oil from the bypass filter to the block, said adapter comprising:

a body 36 having a substantially unobstructed central passage 38 open at each end defining at least three sections of successively larger cross-sectional area 40, 42, 44, a first radial conduit 46 defining an oil inlet from the bypass filter to the middle section 42, an annular channel 48 formed in the body surrounding the smallest section 40 and located to receive dirty oil when the adapter is mounted on the block, a second radial conduit 52 defining a dirty oil outlet from the channel 48 to the bypass filter and an axial conduit 50 defining an oil outlet from the annular channel to the full flow oil filter; and an insert 60 including means for securing the full flow oil filter to the filter mounting block and having an axial passage 68 for returning clean oil from the full flow filter to the mounting block and at least one radial passage 74 communicating with said axial passage, whereby the insert may be inserted into the axial opening of the body, said insert and said body together defining an annular chamber 76 which is in communication with the first radial passage 46 in the body and the radial passage 74 in the insert so that clean oil may return to the axial passage 68 through the insert regardless of the orientation of the body relative to the insert.

2. An adapter as in claim 1, wherein the insert comprises a cylindrical portion 62 having a diameter corresponding to that of the smallest section 40 of the opening 38 in the body 36 and a flange 64 capable of seating in the third section 44 to seal the annular chamber 76.

3. An adapter as in claim 1, wherein the filter mounting block includes a threaded stud 24 defining the clean oil inlet and wherein the axial passage 68 through the insert is threaded to mount directly on the stud.

4. An adapter as in claim 1, wherein the full flow filter 16 has a threaded port 26 defining the clean oil outlet and wherein the adapter includes a threaded nipple 66 for mounting the full flow filter.

* * * * *